3,515,626
THERMOPLASTIC LAMINATES HAVING IMPROVED SURFACE PROPERTIES
Alan Duffield, Wheathampstead, England, assignor to Imperial Chemical Industries Limited, London, England, a corporation of Great Britain
No Drawing. Filed Feb. 7, 1966, Ser. No. 525,356
Claims priority, application Great Britain, Feb. 22, 1965, 7,594/65
Int. Cl. B32b *5/16, 27/36;* C08g *51/04*
U.S. Cl. 161—162   6 Claims

ABSTRACT OF THE DISCLOSURE

Laminates comprising layers of oriented films of thermoplastic materials in which at least one of the outermost layers of film contains a suitable inert additive are prepared. The laminates of this invention are particularly useful as films which may be written on with a pencil or crayon.

---

This invention relates to improvements in or relating to laminates, in particular to laminates comprising polymeric thermoplastic crystallisable films. In the term "crystallisable films" we include crystalline or partially crystalline films.

Biaxially oriented and heat-set films of a crystalline polymer, e.g. polyethylene terephthalate or polypropylene, may contain additives such as dyes, pigments, antistatic agents or particles of solid material to improve the slip of the film. It is often required only to improve the surface properties of such films by incorporation of these additives and the presence of the additives through the whole mass of the film may sometimes be inconvenient, for instance by increasing haze or opacity.

The application to the oriented and heat-set crystallisable film of a surface coating containing additives suffers from the disadvantage that this surface coating is often very thin and can be easily removed by erasure to expose the untreated base film.

It is an object of this invention to overcome this above disadvantage.

According to the present invention we provide a laminate comprising a plurality of layers of an oriented crystallisable thermoplastic film in which at least one of the outermost layers contains an additive as hereinafter defined.

Suitable crystallisable polymers include polymers such as polymers of propylene, high density polymers of ethylene, polymers of 4-methyl pentene-1, block copolymers of one or more of these polymers, polyesters such as polyethylene terephthalate and polyamides such as polyhexamethylene adipamide, polyhexamethylene sebacamide or polycaprolactam.

By "additive" in the above context we include dyes, pigments, antistatic agents, inert materials such as silica (including diatomaceous silica), silicates and alumino slicates, e.g. clays, abrasives such as powdered glass or Carborundum. Other suitable "additives" include polymers other than those from which the film is made, which other polymers either melt at a temperature higher than the highest temperature used during the fabrication of the film or are virtually immiscible with the molten film forming material when the other polymer itself is in the molten state. For example polyamides may be incorporated into polyethylene terephthalate films. Particularly suitable compositions for the outside layer or layers are films of polyethylene terephthalate containing up to 25% by weight of a polyamide.

The concentrations of additive in the outermost layer will depend on the nature of the additive and the purpose for which the laminate is to be used. For example, in the case of a pigment or dye we prefer the outermost layers to contain from 0.01 to 5% by weight of the pigment or dye. In the case of an inert material such as silica or a silica or a silicate which provide a "write-in" surface, we prefer that the outermost layers contain from 1% to 25% of the material.

In order to obtain a satisfactory surface for writing or drawing we have found that the median particle size and particle size distribution of the inert material used are critical. Very small particles produce haze and it is thus preferred that substantially all of the inert material is of particle size greater than 2 microns. Particles of too large a size are also undesirable since these may lead to gross unevenness on the surface and thus it is preferred that substantially all of the inert material is of particle size less than 20 microns. The shape of the particle is also important and is preferably iregular since smooth, rounded particles tend to give slip rather than to improve pencil-take and also may lead to greater voiding in the film during orientation, and so to a reduction in the transparency of the laminate. It is for this reason that we prefer materials such as diatomaceous silica.

In the case of a clay added to improve slip properties, the concentration will normally be in the range 0.05% to 5%.

All the layers of the crystallisable polymeric film comprising the laminate may be oriented in either one or both directions in the plane of the film so that all the layers are oriented to the same extent in any one direction. Alternatively, the layer or layers containing the finely-divided inert material may be oriented in one direction while the remaining layer or layers are biaxially oriented.

The total thickness of the layers of film containing the additive is preferably a minor proportion of the total thickness of the laminate and we especially prefer it to be between 5% and 25% of the total thickness of the laminate.

We also provide a process for the production of a laminate according to the present invention comprising the steps of melt extruding an amorphous film of a crystallisable thermoplastic polymer, quenching the film, heating it to a temperature at which it can be oriented, and at least one stretching step in which the film is oriented in at least one direction in its plane, characterised in that at any stage in said process before the or the final stretching step, one or both sides of the film is coated with the said crystallisable thermoplastic polymer containing an additive as hereinbefore defined.

The laminate is preferably heat set after the final stretching step.

It will be appreciated that in order to carry out the orientation steps mentioned above, the film may be oriented in one direction only, normally either the direction of extrusion (the machine direction) or the direction at right angles to the direction of extrusion (the transverse direction). Alternatively, the film may be successively drawn in either order in the machine and transverse directions and a third draw in the direction first drawn may optionally be applied. Yet another alternative is that the film be extruded as a tube which may then be simultaneously biaxially drawn in known manner. A further draw in either machine or transverse directions may then be applied to said biaxially drawn film.

The process of this invention results in a very intimate contact between the contacting surfaces of the layers comprising the laminate.

In one embodiment of our invention we extrude the layers of the laminate simultaneously through a multi-channel die. For example, a laminate comprising a central layer of polyethylene terephthalate and, on each side of the central layer, a layer of polyethylene terephthalate containing the desired additive may be produced by extrusion from a triple channel die, quenching and biaxial orientation by stretching the amorphous laminate at a temperature above is second order transition temperature in each of two mutually perpendicular directions. The laminate is then preferably heat set at a temperature of from 150–250° C. whereby its dimensional stabilitiy at high temperature is improved.

The additives are suitable for incorporation into the polymer or the polymer-forming reactants before the polymer is converted into film by the conventional method of melt extrusion. For example, the finely divided particles can be mixed by, for example, tumble blending with polymer chip prior to the introduction of the latter into the extrusion feed hopper or they may be added to the molten polymer. Master batch techniques may conveniently be used. In the case of polyethylene terephthalate, additives which are not of an acid pH and do not otherwise interfere with the polycondensation and polymerisation reactions can be incorporated into the polyester-forming reactants or a low molecular weight product formed therefrom, which is subsequently polymerised to a high molecular film-forming polymer in the presence of the said additives. The polyester may be made by the polycondensation of bis($\beta$-hydroxyethyl) terephthalate which may be made by any known method. If an ester-interchange or esterification with ethylene glycol is involved, the additive may conveniently be introduced into the mixture in the form of a dispersion or solution in ethylene glycol. The additive may also be dispersed or dissolved in molten bis($\beta$-hydroxyethyl) terephthalate if desired.

The laminates of this invention may be used for most of the applications for which oriented crystalline films have been used, in thicknesses from 0.0005 inch to 0.01 inch. For example, they may be used as packaging films, the outer surface of the laminate being made especially suitable for receiving printed matter, for instance by the inclusion of a small amount of silica, or for the adhesion of a heat sealable coating, again by incorporation of a suitable additive in the outer surface of the laminate.

The laminates may be metallised and a particularly pleasing effect similar to that of anodised aluminium is obtained by the vacuum deposition of aluminium on a laminate containing clay in its outer layer.

The silica- or clay-filled laminates are particularly suitable for use as drawing office film. By choice of the correct type of silica, drawing office films with excellent "pencil-take" may be obtained.

Further applications include electrical uses such as capacitor windings, insulation of tapes and cable lapping. In all these applications the inclusion of a small amount of additive in the outer layers of the laminate to improve adhesion, light stability or to impart colouring to the film may be desirable.

The laminates may be used as magnetic recording tape, that is sound or video tapes for general or computer use. Laminates which have been stretched in one direction only or to a greater extent in one of two directions are particularly suitable for this use.

Further uses include textile threads which are produced by slitting the laminate or the metallised laminate; laminations with wood, paper or fabrics in the production of pictures or book covers; braiding or packaging tape; tear tapes for packages and pressure sensitive tapes or adhesive tapes.

Our invention is illustrated but in no way limited by the following examples.

EXAMPLE 1

Chips of polyethylene terephthalate containing ⅛% by weight of china clay of average particle size about 4 microns were melt extruded into film and the quenched film reheated to 90–100° C. and drawn at a ratio of 3.5:1 in both machine and transverse directions, giving a film of 100 gauge thickness. The biaxially oriented film was heat-set at a temperature of 210° C. This single layer film had a haze value when measured by the Gardener Haze Test of 6%. Film containing ⅛% china clay of average particle size about 4% microns was melt extruded from the two outside orifices of a triple orifice die and unfilled polyethylene terephthalate extruded from the centre orifice, the laminate thus obtained was quenched and reheated to 90–110° C. and drawn at a ratio of 3.5:1 in both machine and transverse directions to give a three ply laminate of total thickness 100 gauge, the central layer being 80 gauge and the outside layers each 10 gauge. The haze value of this laminate was found to be 1.5% when measured by the Standard Gardener Haze Test. The biaxially oriented laminate was heat set at a temperature of 210° C.

EXAMPLE 2

Polyethylene terephthalate containing 4% by weight of Celite (diatomaceous silica) of average particle size about 12 microns was cast into film by the method set out in Example 1 to give biaxially oriented, heat-set film of thickness 200 gauge. A single layer of the film was found to have a total luminous transmission of less than 50%. A three ply laminate was then formed by extruding the filled polyethylene terephthalate onto either side of an extruding unfilled polyethylene terephthalate layer from a triple channel die, quenching and stretching the laminate at a ratio of 3.5:1 in both the machine and transverse directions, giving a laminate of a total thickness of 200 gauge, the central layer of which was of thickness 170 gauge, and each of the outer layers was of thickness 15 gauge. The laminate was found to have a total luminous transmission of 75%.

EXAMPLE 3

Fine particles of Nylon 66 were mixed with chips of polyethylene terephthalate and melt extruded into film containing 25% by weight of Nylon 66, the quenched film was reheated at 90–110° C. and drawn at a ratio of 3.5:1 in both machine and transverse directions to give a film of thickness 200 gauge. The biaxially oriented film was heat-set at a temperature of 210° C. The single layer film was found to have a total luminous transmission of less than 50%. A three ply laminate of an unfilled polyethylene terephthalate layer between two layers of polyethylene terephthalate containing 25% of Nylon 66 was prepared by the process set out in Example 1. The central layer of the resultant laminate was of 150 gauge thickness and the outside layers were each of 25 gauge thickness. The laminate had a matt surface which was receptive to ink and pencil and had a total luminous transmission of 75%.

I claim:
1. A drafting film having a pencil take surface and capable of transmitting light comprising a laminate of a plurality of layers of oriented polyethylene terephthalate film in which at least one of the outermost layers contains from 1% to 25% by weight of that layer of an inert additive substantially all of which is of particle sizes between 2 and 20 microns, whereby the said at least one outermost layer has a pencil take surface, and the total thickness of the layers containing the additive is between 5% and 25% of the total thickness of the laminate.

2. A drafting film according to claim 1 in which the inert additive is selected from the group consisting of silica, silicates and alumino silicates.

3. A drafting film according to claim 1 in which the inert additive is selected from the group consisting of powdered glass and Carborundum.

4. A drafting film according to claim 1 in which all the layers are oriented to the same extent in any one direction.

5. A drafting film according to claim 1 in which layers containing the finely divided inert additive are oriented in one direction in the plane of the film while the remaining layers are biaxially oriented.

6. A three ply drafting film according to claim 1 comprising a central layer of unfilled polyethylene terephthalate bonded to two layers of polyethylene terephthalate each containing from 1% to 25% by weight of that layer of inert additive.

References Cited
UNITED STATES PATENTS

| | | | |
|---|---|---|---|
| 2,948,583 | 8/1960 | Adams et al. | 264—297 X |
| 3,017,302 | 1/1962 | Hultkrans | 156—244 X |
| 3,154,461 | 10/1964 | Johnson | 161—402 X |
| 3,187,982 | 6/1965 | Underwood et al. | 156—244 X |
| 3,201,506 | 8/1965 | Bills | 264—210 |
| 3,238,284 | 3/1966 | Sutton | 156—244 X |
| 3,382,305 | 5/1968 | Breen | 260—857 X |

JOHN T. GOOLKASIAN, Primary Examiner

R. A. KILLWORTH, Assistant Examiner

U.S. Cl. X.R.

117—100; 156—244; 161—164, 165, 166, 168, 194, 231, 402; 260—40; 264—210